United States Patent
Fuehrer

(10) Patent No.: US 7,920,587 B2
(45) Date of Patent: Apr. 5, 2011

(54) METHOD FOR ESTABLISHING A GLOBAL TIME BASE IN A TIME-CONTROLLED COMMUNICATIONS SYSTEM AND COMMUNICATIONS SYSTEM

(75) Inventor: Thomas Fuehrer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 11/628,582

(22) PCT Filed: Mar. 30, 2005

(86) PCT No.: PCT/EP2005/051447
§ 371 (c)(1),
(2), (4) Date: Nov. 16, 2007

(87) PCT Pub. No.: WO2005/119951
PCT Pub. Date: Dec. 15, 2005

(65) Prior Publication Data
US 2008/0198868 A1   Aug. 21, 2008

(30) Foreign Application Priority Data
Jun. 4, 2004   (DE) .................. 10 2004 027 503

(51) Int. Cl.
*H04B 7/212* (2006.01)
(52) U.S. Cl. .................... 370/442; 370/338; 370/503
(58) Field of Classification Search .......... 370/200–253, 370/272–309, 431–546, 337, 338, 347
See application file for complete search history.

(56) References Cited

U.S. PATENT DOCUMENTS

| | | | | |
|---|---|---|---|---|
| 4,144,414 A | * | 3/1979 | Nicholas ................... | 370/507 |
| 4,412,342 A | * | 10/1983 | Khan et al. ................. | 375/356 |
| 4,677,614 A | * | 6/1987 | Circo ......................... | 370/222 |
| 4,939,752 A | | 7/1990 | Literati et al. | |
| 5,577,075 A | | 11/1996 | Cotton et al. | |
| 5,848,028 A | | 12/1998 | Burklin et al. | |
| 2001/0021196 A1 | | 9/2001 | Weigl et al. | |
| 2003/0179712 A1 | * | 9/2003 | Kobayashi et al. .......... | 370/249 |
| 2006/0143345 A1 | * | 6/2006 | Fredriksson ................ | 710/106 |

FOREIGN PATENT DOCUMENTS

| | | |
|---|---|---|
| EP | 1 179 920 | 2/2002 |
| EP | 1 355 456 | 10/2003 |
| EP | 1 355 459 | 10/2003 |
| JP | 2001 223720 | 8/2001 |

* cited by examiner

*Primary Examiner* — Ricky Ngo
*Assistant Examiner* — Iqbal Zaidi
(74) *Attorney, Agent, or Firm* — Kenyon & Kenyon LLP

(57) ABSTRACT

A method for establishing a global time base in a time-controlled communications system comprising a network and multiple subscribers connected to it. At least one of the subscribers of the communications system is defined as a time master with which the remaining subscribers are synchronized. In order to allow for a synchronization of the communications system that is on the one hand as simple as possible and realizable at low cost and on the other hand is secure and reliable, the present invention provides for one subscriber to be defined as the main time master and at least one further subscriber to be defined as a reserve time master. The order of the reserve time masters is predefined in the event that more than one subscriber is defined as a reserve time master. First an attempt is made to synchronize all subscribers of the communications system with the main time master. If this fails, then in each case the next reserve time master in the predefined order is selected and the attempt is made to synchronize all subscribers of the communications system with the selected reserve time master until either the synchronization of the subscribers of the communications system is successful or a synchronization of the subscribers with the last reserve time master fails as well.

15 Claims, 3 Drawing Sheets

METHOD FOR ESTABLISHING A GLOBAL TIME BASE IN A TIME-CONTROLLED COMMUNICATIONS SYSTEM AND COMMUNICATIONS SYSTEM

FIELD OF THE INVENTION

The present invention relates to a method for establishing a global time base in a time-controlled communications system. The communications system comprises a network and several subscribers connected to it. At least one of the subscribers is defined as a time master with which the remaining subscribers of the communications system are synchronized.

The present invention also relates to a time-controlled communications system comprising a network and several subscribers connected to it. At least one of the subscribers is defined as the time master with which the remaining subscribers of the communications system are synchronized.

BACKGROUND INFORMATION

In time-controlled, cycle-based communications system, messages are sent in a cyclical manner following a fixed time scheme. The time sequence is derived from an asynchronous timer. The time scheme results from a predefined communications cycle, which is divided into multiple send slots. A message is uniquely assigned to a send slot. A message thus has a definite position in the communications cycle.

It is known to have the asynchronous timer, the so-called global time base, ascertained by an algorithm running in a distributed manner on the communications computers, the so-called subscribers, on the basis of specially marked messages. For this purpose, time measurements are taken from all subscribers of the communications system on the basis of special unequivocal messages, these time measurements are averaged, and the global time base is then computed with the aid of an algorithm. The algorithm may compute the arithmetic mean of the time measurements, for example, which will then be used as the global time base. The local clocks of the subscribers are then synchronized with this computed global time base.

Alternatively, it is known for the establishment of a global time base to be based on the principle of a time master. For this purpose, one of the subscribers is assigned the function of the time master, the local clock of the time master is used as the global time base, and the other subscribers in the communications system are synchronized with the local clock of the time master or a time base derived from it. The time master ensures that the communications system starts and that it operates normally according to specification. The synchronization of the subscribers with the time master thus occurs both following the run-up of the communications system as well as from time to time during the normal operation of the communications system.

Within the scope of the synchronization, the time master sends a so-called reference message including a time information (as is generally known for example in the functional principle of a TTCAN (time triggered controller area network) communications system), which is used by all other subscribers for the purpose of synchronization. That is to say, the local clocks are synchronized with the time information of this reference message. This principle is problematic, however, since in the event of a failure of the time master a synchronization of the subscribers is no longer possible and consequently a continued operation of the communications system is possible only to a limited extent or not at all. A communications system operating according to this principle thus does not offer sufficient uptime and security for many security-related applications, particularly in the automotive sector.

Modern cycle-based communications systems support the option on the one hand of sending deterministic, time-controlled data from exactly one subscriber at a fixed point in time and on the other hand of spontaneously sending event-oriented data, for example diagnostic data, when a certain event occurs. For this purpose, the cyclically recurring communications cycle is organized in a special manner. Thus it is known, for example, from a FlexRay communications system to divide the communications cycle into a static segment and an optional dynamic segment. A so-called "network idle time" (NIT) concludes the communications cycle. Such a configuration is called a dynamic mode.

SUMMARY OF THE INVENTION

Starting from the described related art, the present invention is based on the objective of improving the security, reliability and uptime in a communications system in which the subscribers are synchronized with a global time base with the aid of a time master.

To achieve this objective it is provided, starting from the method of the kind mentioned at the beginning, for one subscriber to be defined as the main time master and at least one additional subscriber to be defined as a reserve time master. For this purpose, the order of the reserve time masters is predefined in the event that more than one subscriber is defined as a reserve time master. First an attempt is made to synchronize all subscribers of the communications system with the main time master. If this fails, then respectively the next reserve time master in the predefined order is selected and the attempt is made to synchronize all subscribers of the communications system with the selected reserve time master until either the synchronization of the subscribers of the communications system is successful or a synchronization of the subscribers with the last reserve time master has failed as well.

In the method according to the present invention, the main time master is protected by one or more reserve time masters for reasons of redundancy. Thus the communications system provides not only for one time master, but for one or more additional potential time masters, depending on the desired degree of redundancy, always only one of the potential time masters being active for the purpose of synchronizing the remaining subscribers of the communications system. In the relevant subscribers that were defined as reserve time masters it is possible to intervene in the application. The application must then reconfigure the subscriber that is defined as a reserve time master in such a way that this subscriber is able to send the time information to the remaining subscribers if required. The method according to the present invention has the advantage that in the event of a failure of a time master, a synchronization of the subscribers is still possible using one of the potential time masters. Consequently, an unrestricted, full-fledged operation of the communications system is possible even after the main time master has failed. The communications system according to the present invention thus features a particularly high security, reliability and uptime, which is extremely important for many applications, particularly applications in the automotive sector that are critical with regards to safety.

An advantageous further development of the present invention provides that, for synchronizing the subscribers of the communications system, the time master with which the subscribers are to be synchronized, sends a reference message with time information, which is received by the other subscribers and is used for synchronizing their local clocks. The reference message has a unique identifier and its payload data include, among other things, the time information from the time master. It can be quickly and securely detected by the other subscribers as a reference message and be used for synchronization.

A preferred specific embodiment of the present invention provides for a subscriber of the communications system to be synchronized as a function of a point in time at which it receives the reference message. It is conceivable that as time information the reference message comprises the time of sending the reference message from the time master and/or predefined times for the reception of the message on the part of the different subscribers to be synchronized. Taking this time information into account it is possible accordingly to synchronize the local clock of the subscriber by a comparison with the time for the actual reception of the reference message on the part of a subscriber, that is, on the basis of the transit time of the reference message.

Advantageously, at least the reserve time master following the currently selected time master in the predefined order monitors the higher-order time master. If the reference message of the currently selected time master fails to appear, then the reserve time master following the currently selected time master in the predefined order on its part sends a reference message. Preferably, the reserve time masters following the currently selected time master in the predefined order monitor the higher-order time master and, if the reference message fails to appear, the reserve time master following the currently selected time master in the predefined order sends on its part a reference message. Thus, following the failure of a higher-order time master, the subsequent potential time master in the predefined order is able to take over the synchronization of the other subscribers of the communications system.

Advantageously, at least the currently selected reserve time master monitors the main time master and, if applicable, the higher-order reserve time masters. If one of the higher-order time masters sends a reference message, then the currently selected time master on its part will dispense with sending a reference message. Preferably, the currently selected time master and the reserve time masters below the currently selected time master in the predefined order monitor the higher-order reserve time masters and the main time master. If one of the higher-order time masters sends a reference message, then the currently selected time master on its part will not send a reference message. In this manner it is achieved that the reserve time masters take over the synchronization of the other subscribers only as long as the time masters higher up in the predefined order do not send a reference message. As soon as one of the higher-order time masters is active again and sends a reference message, the lower-order time master cedes the synchronization function again to the reactivated higher-order time master.

Another advantageous further development of the present invention provides for data in the communications system to be transmitted in a cycle-based manner. The reference messages from different time masters are preferably not sent within the same communications cycle, but rather in consecutive communications cycles.

A further preferred specific embodiment of the present invention provides for data in the communications system to be transmitted in a cycle-based manner. A communications cycle is divided into multiple send slots, of which at least one send slot is part of a static segment of the communications cycle for transmitting deterministic data at a definitively predefined time and at least one further send slot is part of a dynamic segment of the communications cycle for transmitting event-oriented data at a time that is a function of the occurrence of an event. In the static segment, at least as many send slots are provided as the number of main and reserve time masters that have been defined. Each time master is assigned one of the send slots of the static segment of the communications cycle for sending its reference message.

In certain communications systems, for example in a FlexRay, a correction value is determined for a correction rate and an offset (so-called rate and offset correction) of the local clocks with respect to the global time base by measurement over two communications cycles. By the takeover of the function of the time master on the part of a potential time master in an arbitrary communications cycle and by the associated emission of the latter's reference message, the clock synchronization of all other subscribers of the communications system may be impaired. This may be deemed acceptable, a short-term interference in the precision of synchronization then having to be reckoned with in all other subscribers of the communications system. The result would be a correction value for a correction rate of one additional slot length. Depending on the slot length, this would have to be reconciled with the tolerance in the clock synchronization.

Various measures are also conceivable, however, by which the effects of a takeover of the synchronization function on the part of a potential time master between the two monitored communications cycles can be prevented or compensated. In this regard there is a provision, for example, that for synchronizing the subscribers of the communications system following a transition of the time master function from one subscriber to another subscriber, the new time master sends the reference message only in a communications cycle having an odd-numbered cycle counter. Alternatively there is the provision that for synchronizing the subscribers of the communications system following a transition of the time master function from one subscriber to another subscriber, the new time master sends the reference message only in a communications cycle having an even-numbered cycle counter. Depending on whether the two monitored communications cycles end with an even-numbered or odd-numbered cycle counter, both cycles are always allowed to pass before the new time master may send its reference message.

As a further measure there is a provision for the reference message to contain an identifier of the time master and for a change of the identifier between one communications cycle and the next to be taken into account in synchronizing the subscribers of the communications system with the global time base. Such an extension of the clock synchronization in all subscribers of the communications system has the advantage that in the event of a change of the identifier, that is, if the synchronization function migrates from one time master to another, this change can be taken into account when computing the correction value for the correction rate.

Advantageously, the method is executed during the run-up or startup of the communications system. Alternatively or additionally, the method may be executed from time to time during the continuous normal operation of the communications system.

As a further approach for achieving the objective of the present invention, starting from the communications system of the kind mentioned at the outset, a provision is made for one subscriber to be defined as the main time master and at least one additional subscriber to be defined as a reserve time master. The order of the reserve time masters is predefined if more than one subscriber is defined as a reserve time master. The communications system has means which first attempt to synchronize all subscribers of the communications system with the main time master, and then, failing this, to select respectively the next reserve time master in the predefined order and to attempt to synchronize all subscribers of the communications system with the selected reserve time master until either the synchronization of the subscribers of the communications system was successful or until a synchronization of the subscribers with the final reserve time master has failed as well.

DETAILED DESCRIPTION

Figure 1:
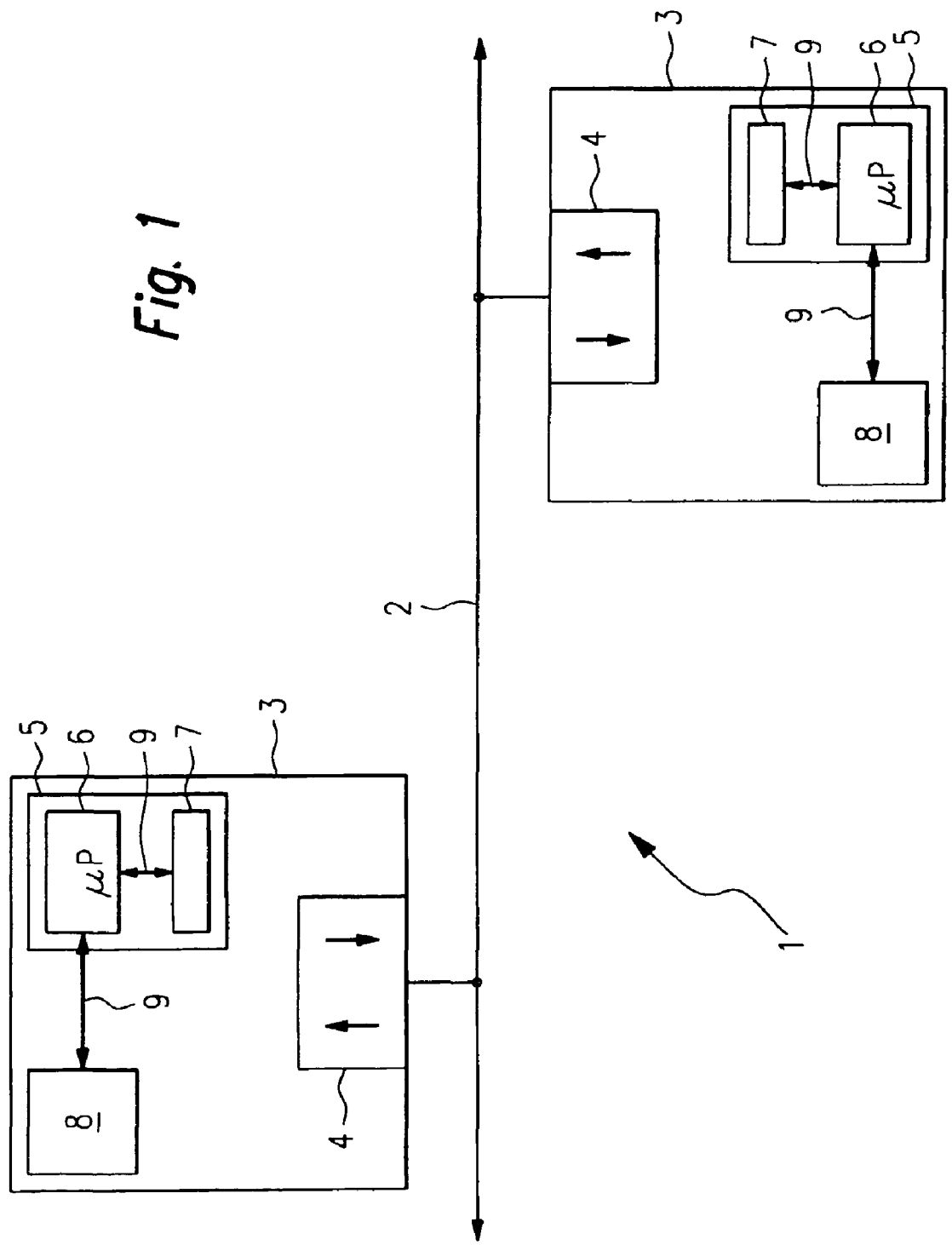
FIG. 1 shows a schematic representation of a time-controlled communications system according to the present invention.

In FIG. 1, a time-controlled communications system according to the present invention is designated in its entirety by reference numeral 1. Communications system 1 comprises a network 2 and several subscribers 3 connected to it. Subscribers 3 are also called nodes or terminal units. A communications system 1 as shown in an exemplary manner in FIG. 1 is used, for example, in motor vehicles for exchanging information between different motor vehicle components (the subscribers). Subscribers 3 are connected to network 2 via interfaces 4. Subscribers 3 comprise a computer 5 having a microprocessor 6 and an internal memory element 7. In addition, an external memory element 8, that is, one that is situated outside of microprocessor 6, may also be provided. Network 2 may have a ring structure, a star structure or any other structure.

A computer program for controlling and/or regulating subscribers 3, particularly for controlling and/or regulating the information exchange between subscribers 3 across network 2, is stored on memory elements 7, 8. The computer program is able to be executed on microprocessor 6. For this purpose, it is transmitted via a data transmission link 9 from memory element 7, 8 to microprocessor 6. FIG. 1 merely shows two subscribers 3 of communications system 1. Communications system 1 according to the present invention may of course also comprise more than two subscribers 3.

Figure 2:
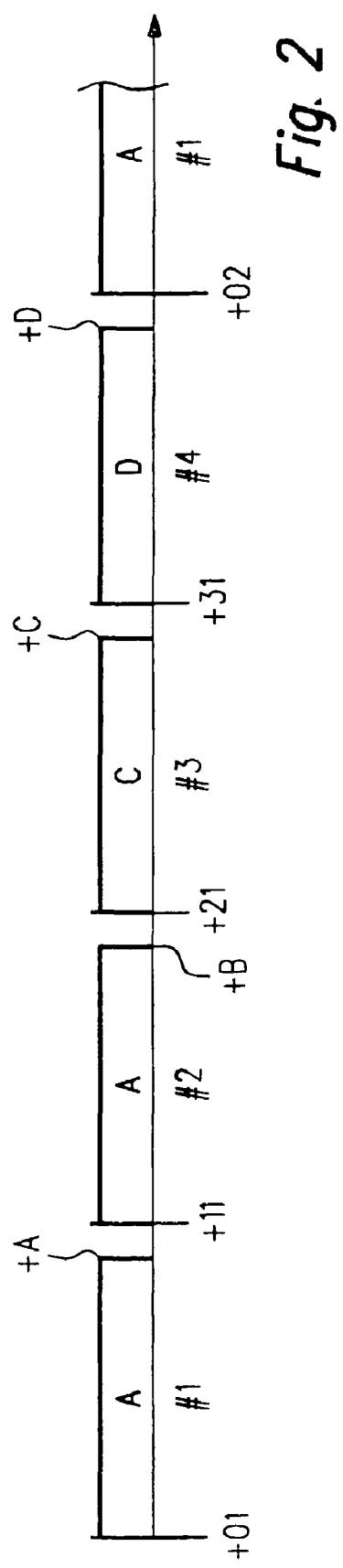
FIG. 2 shows a communications cycle for transmitting data in a time-controlled communications system.

Communications system 1 shown in FIG. 1 is a time-controlled communications system, in which messages are transmitted cyclically in a fixed time scheme. The time sequence is derived from an asynchronous timer (so-called global time base). For this purpose, the time scheme (a so-called communications cycle) is divided into multiple send slots. A message is uniquely assigned to one of the send slot. A message thus has a predefined position within the communications cycle. A representative time scheme is shown in FIG. 2 in an exemplary manner. The communications cycle shown there by way of example comprises four send slots numbered from 1 through 4. The send slots of the first cycle begin at time t01, t11, t21 and t31 respectively. Subsequently, the first send slot of the next communications cycle begins at time t02. A specific message is assigned to each send slot. Thus, message A is assigned to send slot #1, message B to send slot #2, message C to send slot #3 and message D to send slot #4. Messages A through D do not always take up the entire length of the respective send slot 1 through 4 assigned to them. In the exemplary embodiment shown, message A ends at time tA, message B at time tB, message C at time tC and message D at time tD, where tA<t11, tB<t21, tC<t31 and tD<t02.

It is not necessary for messages A through D assigned to time slots #1 through #4 to be transmitted in each communications cycle. It is quite possible for a send slot #1 through #4 to be empty in one or the other communications cycle since in this cycle no message A through D needs to be transmitted.

In accordance with the related art, the asynchronous timer, the global time base, is calculated in different ways. On the one hand, it is known to compute the global time base using an algorithm running in a distributed manner in subscribers 3 on the basis of specially marked messages A through D. For this purpose, time measurements are taken from all subscribers 3 on the basis of special unequivocal messages, these time measurements are averaged and thus for example a desired average is computed for the global time base. The local clocks of subscribers 3 are then synchronized with this computed average value.

On the other hand, a global time base may also be established on the principle of a time master. Communications system 1 according to the present invention employs this method of establishing a global time base using a time master. For this purpose, at least one subscriber 3 of communications system 1 is defined as time master with which the other subscribers 3 of communications system 1 are synchronized. The time master sends a so-called reference message which is used by all other subscribers 3 for synchronization. The local clocks of the other subscribers 3 are synchronized with the time information contained in the reference message.

Figure 3:
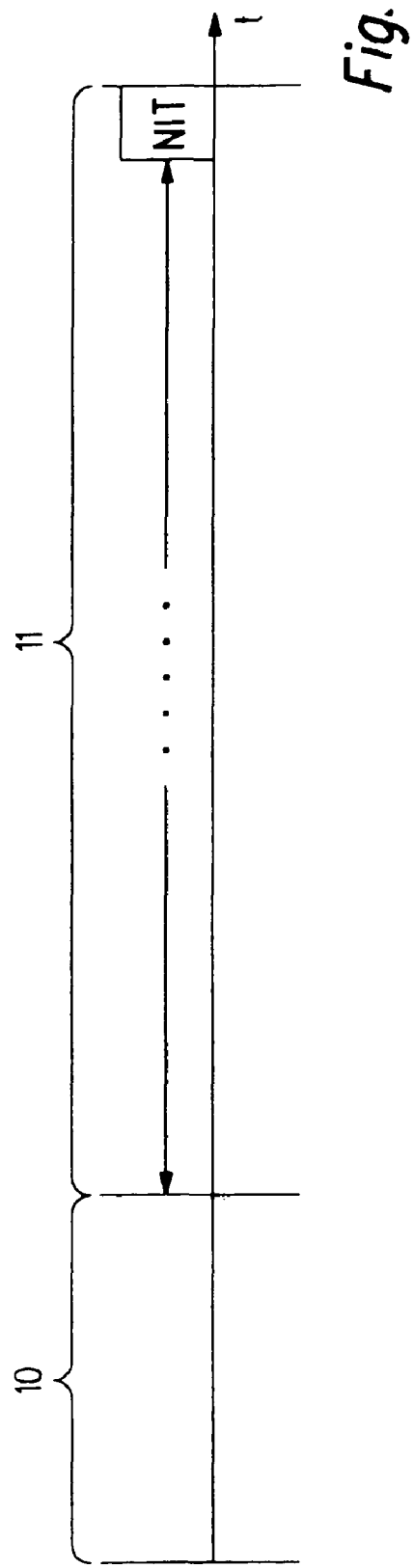
FIG. 3 shows a communications cycle for transmitting data in a time-controlled communications system with dynamic mode.
Figure 4:
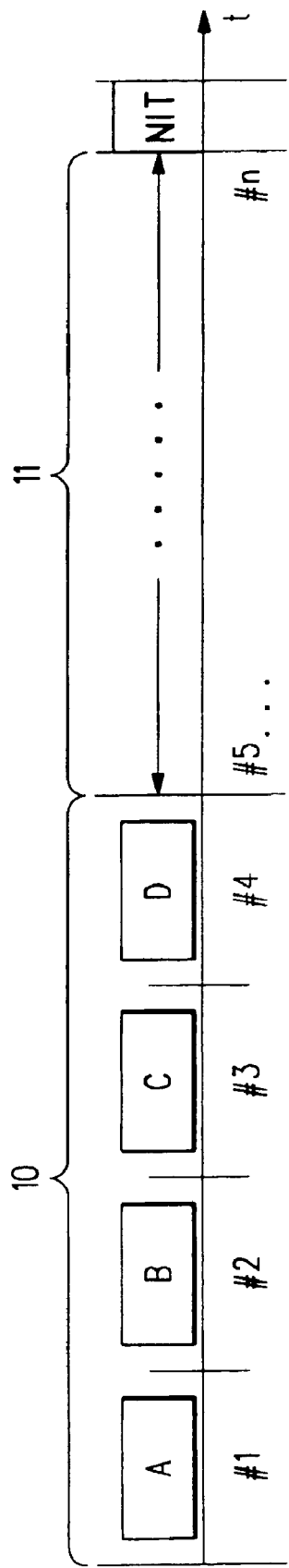
FIG. 4 shows a communications cycle for transmitting data in a time-controlled communications system from FIG. 1.

FIG. 3 shows a communications system 1 that takes into account the necessity of sending, on the one hand, deterministic, time-controlled data from precisely one subscriber 3 at a set time and of sending, on the other hand, event-oriented data spontaneously, for example following the occurrence of a specific event, from a subscriber 3. Examples of event-oriented data are diagnostic data or sensor data, which only need to be transmitted from time to time. FIG. 3 shows the structure of a communications cycle for a communications system operating according to the FlexRay standard. The communications cycle comprises static segment 10 and dynamic segment 11. Messages A through D are transmitted deterministically in send slots #1 through #4 of static segment 10 (cf. FIG. 4). In additional send slots #5 through #n, messages may be transmitted in an event-oriented manner, the arbitration of the so-called data frames occurring in accordance with the FlexRay minislotting method.

The present invention is explained in more detail in the following with reference to a communications system 1 operating according to the FlexRay standard. The present invention, however, is not limited to the FlexRay standard. In the case of the FlexRay standard, a communications cycle is divided into a static segment for deterministic data transmission and an optional dynamic segment for event-oriented data transmission. A communications cycle is concluded by a so-called network idle time (NIT). This configuration is called a so-called dynamic mode.

Figure 5:
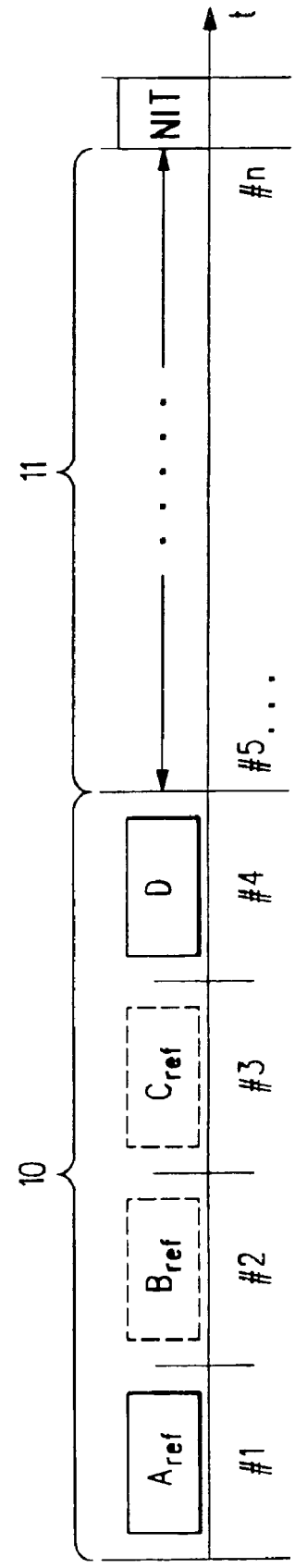
FIG. 5 shows a sequence of the method according to the present invention on the basis of a communications cycle.

FIG. 5 shows the structure of a communications cycle of a communications system 1 according to the present invention. To implement the present invention, one of the subscribers 3 is configured as the main time master in communications system 1. Send slot #1 of static segment 10 is reserved for a reference message $A_{ref}$ of the main time master. The other subscribers 3 of communications system 1 are synchronized with the time information contained in reference message $A_{ref}$. In dynamic segment 11, data are transmitted in an event-oriented manner. The communications cycle is concluded by the network idle time (NIT).

A communications cycle of a communications system known from the related art contains only one central time master such that the communications cycle must be configured as follows: a static segment 10 for precisely one reference message $A_{ref}$ of the time master and further messages B, C, D from further subscribers (the so-called slaves) and one dynamic segment 11 extending to the end of the communications cycle for messages sent spontaneously by the subscribers of the known communications system. If protection of the time master is desired for redundancy reasons, then this may only be achieved in the communications system known from the related art via an intervention of the application. The application must then reconfigure a suitable subscriber in such a way that this subscriber is able to send a reference message within the scope of a communications cycle shown in FIG. 3, while during this time, however, the communications system no longer communicates. An elaborate diagnostics is required for the application to switch over the subscriber, and in addition significant restrictions of the real-time capability of the protocol may result.

By contrast, the present invention ensures the redundancy of the reference message with the aid of protocol mechanisms. Moreover, at least one further subscriber 3 is defined as a reserve time master in addition to the main time master.

For a desired n-fold redundancy, the communications cycle of communications system 1 according to the present invention shown in FIG. 5, provides, in addition to send slot #1 for the main time master, n additional static send slots #2 . . . # (n+1) for transmitting potential reference messages so that a total of (n+1) send slots are reserved for reference messages in static segment 10. A redundancy of n=2 is chosen in the exemplary embodiment from FIG. 5. Of course, any other redundancy n ∈ N may be chosen as well, where N represents any natural number. In this case then in static segment 10 altogether 2 or 11 static send slots would have to be provided for reference message $A_{ref}$ and the other potential reference messages $B_{ref}$.

The main time master sends its reference message $A_{ref}$ in first send slot #1. The main time master ensures that communications system 1 starts and that it operates normally according to specification. The time information in reference message $A_{ref}$ directly enters into the clock synchronization of the reserve time masters and all other subscribers 3. After the main time master has transmitted its reference message $A_{ref}$, additional send slots #2, #3 remain in communications cycle n=2, which are provided for n potential reference messages $B_{ref}$ and $C_{ref}$.

To implement the present invention, the protocol specification is extended in that the potential time masters (the so-called reserve time masters) monitor the main time master in operation, i.e. the reception of reference message $A_{ref}$ is verified at a definite, predefined time in send slot #1. If reference message $A_{ref}$ is received in send slot #1, no further reference message $B_{ref}$, $C_{ref}$ is sent by the reserve time masters. A reference message $B_{ref}$, $C_{ref}$ must not be sent by the potential time masters so as not to impair the mechanism for the clock synchronization of all other subscribers 3. The clock synchronization is to be effected solely by the main time master. There is the possibility, however, to have a "normal" data message sent by the potential time masters. Send slot #4 of static segment 10 as well as the send slots of dynamic segment 11 are used by the remaining subscribers 3 (slaves) in the conventional manner for transmitting information.

If the potential time masters, however, determine a failure of main reference message $A_{ref}$ (reference message $A_{ref}$ is missing in send slot #1), then the potential time masters prepare their own reference message $B_{ref}$, $C_{ref}$. If the send time of a reserve time master is reached and no other reference message $A_{ref}$ or $B_{ref}$ of a higher-order time master was received, then local reference message $B_{ref}$ or $C_{ref}$ is sent.

The order, in which the reserve time masters, if required, send their reference messages $B_{ref}$, $C_{ref}$, is predefined. In the present exemplary embodiment, the first potential time master, according to the predefined order, would now send its reference message $B_{ref}$ in send slot #2 since the main reference message $A_{ref}$ failed in send slot #1. The next potential time master would in this case not send its own reference message $C_{ref}$ in its send slot #3. If the first reserve time master were likewise to fail, however, then this is detected by the subsequent reserve time master, and the latter then sends reference message $C_{ref}$ in send slot #3.

All subscribers 3 of communications system 1 are synchronized with the particular time master that has transmitted its reference message $A_{ref}$ through $C_{ref}$. This means that all subscribers 3 are synchronized with the same time base. Because the time master function is taken over by another time master, no jumps result since all subscribers 3 (the main time master, the reserve time masters as well as the remaining subscribers (slaves)) were synchronized with the same time master in continuous operation by clock synchronization.

Because of the takeover of the time master function on the part of a potential time master and because of the associated transmission of reference message $B_{ref}$ or $C_{ref}$ of the reserve time master, however, the clock synchronization of remaining subscribers 3 (of the main time master, the remaining potential time masters and all remaining slaves) is influenced inasmuch as the ascertainment of a correction value for a correction rate (so-called rate correction) and for an offset occurs by a measurement across two communication cycles. In accordance with the FlexRay specification, the receiving time of the reference message in send slot #n (for example in the case of an odd-numbered cycle counter) is compared to the receiving time of the reference message in send slot #n+1 (in the case of an even-numbered cycle counter) and the rate (deviation of the local clock across the communications cycle) is inferred via the preconfigured duration of the cycle for each subscriber 3. If another subscriber 3 takes over the time master function during such a measurement, this must be taken into account. The following possibilities present themselves:

a) The potential time master may send its reference message $B_{ref}$ or $C_{ref}$ only with an odd-numbered cycle counter. In the worst case, this results in an interruption of communication for one entire communications cycle.

b) The clock synchronization in all subscribers 3 is extended in that reference messages $A_{ref}$ through $C_{ref}$ contain an identifier of the time master that sent the reference message $A_{ref}$ through $C_{ref}$ and that the identifier is taken into account in the synchronization. If the identifier for reference message $A_{ref}$ through $C_{ref}$ changes, this can be taken into account when computing the rate.

c) The change is not taken into account and thus a short-term fault is tolerated in the synchronization precision in all slaves and potential time masters. The result would be a rate correction of additionally one length of a send slot. Depending on the length of the send slot, this would have to be reconciled with the tolerance in the clock synchronization.

The present invention was extended on the basis of an extension of the protocol of an existing FlexRay specification by the automated takeover of the function of the time master following the failure of the main time master. The present invention, of course, may also be used in communications systems 1 that work according to a different standard than the FlexRay standard. Due to a low bandwidth provision (n additional send slots in the communications cycle or in the static segment at a desired n-fold redundancy of the time master) and a supplement in the functional specification, an automated n-fold redundancy of the time master is made possible according to the present invention in a time-controlled communications system 1.

Below, various features and advantages of the present invention are explained once again in more detail:

The present invention may be used in communications systems in which the local clocks of the subscribers are synchronized with the aid of a time master and may even be used in such communications systems in which messages can be transmitted both in a time-controlled (deterministic) manner as well as in an event-controlled manner.

A nearly arbitrarily high redundancy of the time master may be achieved by the present invention, more bandwidth in the communications cycle or the static segment having to be provided for the potential time masters with increasing redundancy.

Using the present invention, the communications system may be configured both during the run-up as well as during normal operation.

The main time master receives the apportionment for send slot #1 in the communications cycle as a static send slot. The main time master is responsible for starting the network and for specifying the time values for all subscribers 3 (potential time masters and slaves) in normal operation.

If an n-fold redundancy is desired, then additional n send slots are configured for the potential time masters. Their reference messages are not sent, however, as long as the main time master or a reserve time master preceding in a predefined order are active. According to the specification, the clock synchronization is not affected by additional reference messages since each communications cycle may contain only one reference message. In a faultless operation of the communications system, all subscribers (reserve time master and slaves) are synchronized with the main time master.

A failure of the main time master is detected in light of the missing reference message by at least one, preferably by all potential time masters.

The next potential time master in the time characteristic of a communications cycle according to the predefined order then takes over the transmission of the reference message with its local time information and message identifier of the time master.

Only the active time master (main or reserve time master) ever transmits, while all other time masters do not send a reference message.

All other subscribers detect the new time master by the modified message identifier of the reference message.

The time measurement of the new reference message is synchronized with the old time measurement of the old reference message. The clock synchronization computes the new rate correction value and offset correction value.

The change of the message identifier in the reference message influences the calculation of the rate and offset correction values.

The active potential time master then cedes the time master function again to the main time master or the higher-order reserve time master, it being no longer allowed to send its reference message.

wherein one subscriber (3) is defined as the main time master and at least one further: subscriber (3) is defined as a reserve time master, the order of the reserve time masters being predefined in case more than one subscriber (3) is defined as a reserve time master, the communications system (1) has means which first attempt to synchronize all subscribers (3) of the communications system (1) with the main time master and then, if this fails, select in the predefined order respectively the next reserve time master and attempt to synchronize all subscribers (3) of the communications system (1) with the selected reserve time master until either the synchronization of the subscribers (3) of the communications system (1) has succeeded or a synchronization of the subscribers (3) with the final reserve time master has failed as well.

What is claimed is:

1. A method for establishing a global time base in a time-controlled communications system that comprises a network and multiple subscribers connected to this network, the method comprising:
    defining at least one of the subscribers of the communications system as a time master with which the remaining subscribers are synchronized;
    defining one subscriber as the main time master and at least one additional subscriber as a reserve time master;
    predefining the order of the reserve time masters when more than one subscriber is defined as a reserve time master;
    configuring each of the subscribers to make an initial attempt at synchronizing with the main time master; and
    configuring each of the subscribers to, when the initial attempt fails, attempt to synchronize with a selected reserve time master, wherein the selected reserve time master is the next reserve time master in the predefined order, the selected reserve time master is configured to automatically select itself, and the attempt to synchronize with a selected reserve time master continues until either the synchronization of the subscribers has succeeded or a synchronization of the subscribers with the last reserve time master has failed.

2. The method as recited in claim 1, wherein for synchronizing the subscribers of the communications system, the time master, with which the subscribers are to be synchronized, sends a reference message with time information, which is received by the other subscribers and is used for synchronizing their local clocks.

3. The method as recited in claim 2, wherein a subscriber of the communications system is synchronized as a function of a time at which it receives the reference message.

4. The method as recited in claim 2, wherein at least the reserve time master following the currently selected time master in the predefined order monitors the higher-order time master and, if the reference message fails to appear, the reserve time master following the currently selected time master in the predefined order on its part sends a reference message.

5. The method as recited in claim 4, wherein the reserve time masters following the currently selected time master in the predefined order monitor the higher-order time master and, if the reference message fails to appear, the reserve time master below the currently selected time master in the predefined order on its part sends a reference message.

6. The method as recited in claim 2, wherein at least the currently selected reserve time master monitors the main time master and, if indicated, the higher-order time masters, and the currently selected time master on its part does not send a reference message in case one of the higher-order time masters sends a reference message.

7. The method as recited in claim 6, wherein the currently selected time master and the reserve time masters following the currently selected time master in the predefined order monitor the main time master and, if indicated, the higher-order reserve time masters, and the currently selected time master on its part does not send a reference message in case one of the higher-order time masters sends a reference message.

8. The method as recited in claim 7, wherein data are transmitted in the communications system in a cycle-based manner, the reference messages being sent by different time masters in consecutive communications cycles.

9. The method as recited in claim 2, wherein for synchronizing the subscribers of the communications system following a transition of the time master function from one subscriber to another subscriber, the new time master sends the reference message only in a communications cycle having an odd-numbered cycle counter.

10. The method as recited in claim 2, wherein for synchronizing the subscribers of the communications system following a transition of the time master function from one subscriber to another subscriber, the new time master sends the reference message only in a communications cycle having an even-numbered cycle counter.

11. The method as recited in claim 2, wherein the reference message contains an identifier of the time master and a change of the identifier between one communications cycle and the next is taken into account in the synchronization of the subscribers of the communications system with the global time base.

12. The method as recited in claim 1, wherein data are transmitted in the communications system in a cycle-based manner, a communications cycle being divided into multiple send slots, of which at least one send slot is part of a static segment of the communications cycle for transmitting deterministic data at a definitively predetermined time and at least one further send slot is part of a dynamic segment of the communications cycle for transmitting event-oriented data at a time that is a function of the occurrence of an event, at least as many send slots being provided in the static segment as the number of main and reserve time masters that have been defined, and each time master being assigned one of the send slots of the static segment of the communications cycle for sending its reference message.

13. The method as recited in claim 1, wherein the method is implemented during the run-up of the communications system.

14. The method as recited in claim 1, wherein the method is implemented from time to time during the continuous operation of the communications system.

15. A time-controlled communications system, comprising:
a network;
several subscribers connected to the network, at least one of the subscribers being defined as the time master with which the other subscribers of the communications system are synchronized, wherein one subscriber is defined as the main time master and at least one further subscriber is defined as a reserve time master, the order of the reserve time masters being predefined when more than one subscriber is defined as a reserve time master;
means for performing an initial attempt at synchronizing each of the subscribers with the main time master;
means for, when the initial attempt fails, attempting to synchronize each of the subscribers with a selected reserve time master, which is the next reserve time master in the predefined order;
means for causing the selected reserve time master to automatically select itself; and
means for continuing the attempting to synchronize each of the subscribers with a selected reserve time master until either the synchronization of the subscribers has succeeded or a synchronization of the subscribers with the last reserve time master has failed.

* * * * *